Feb. 3, 1970        A. DODGE        3,492,859
HYDRAULIC PRESSURE MEASURING SYSTEM
Filed Aug. 22, 1967        2 Sheets-Sheet 1
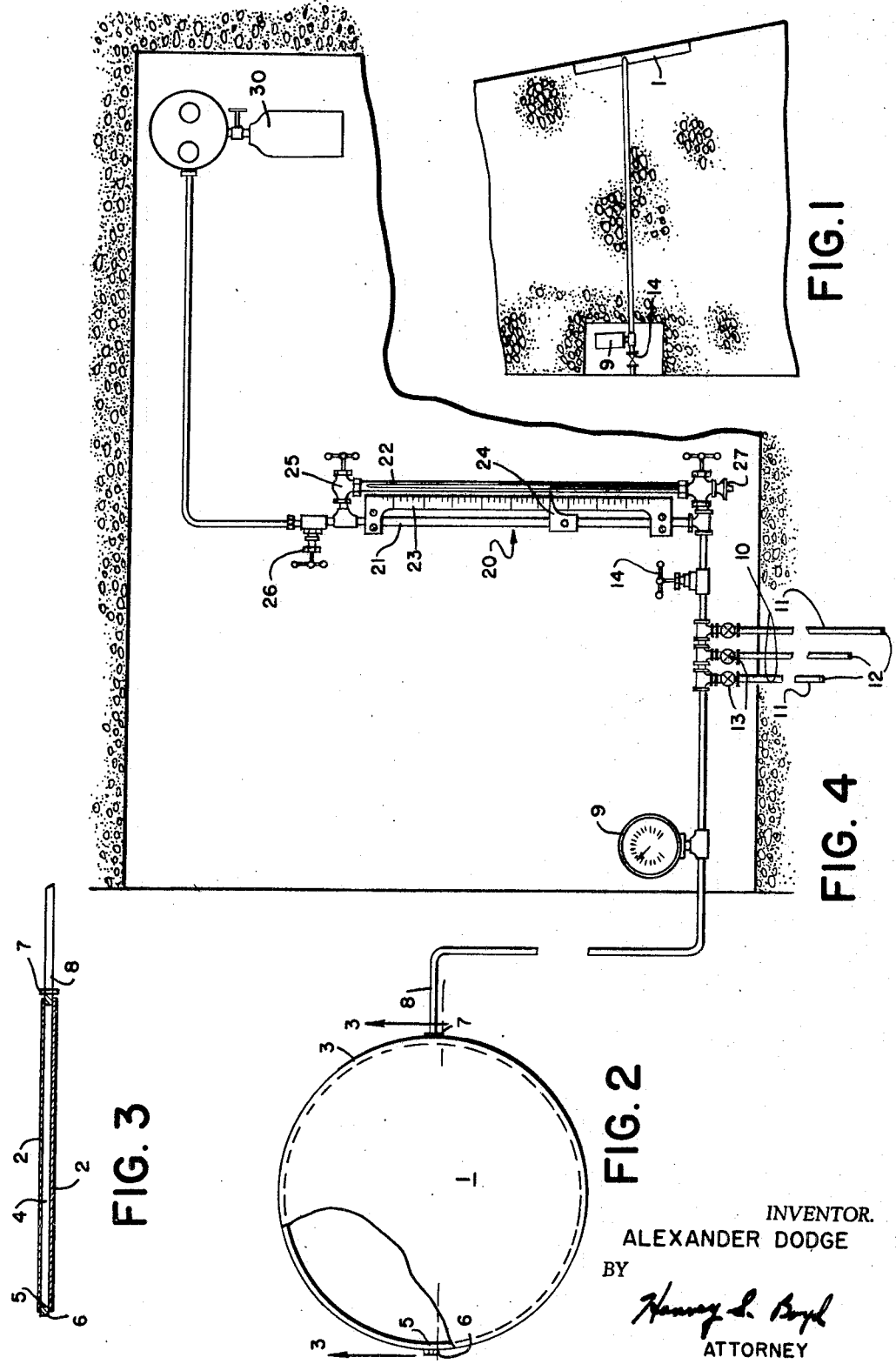
INVENTOR.
ALEXANDER DODGE
BY
ATTORNEY Feb. 3, 1970     A. DODGE     3,492,859
HYDRAULIC PRESSURE MEASURING SYSTEM
Filed Aug. 22, 1967     2 Sheets-Sheet 2
FIG. 5
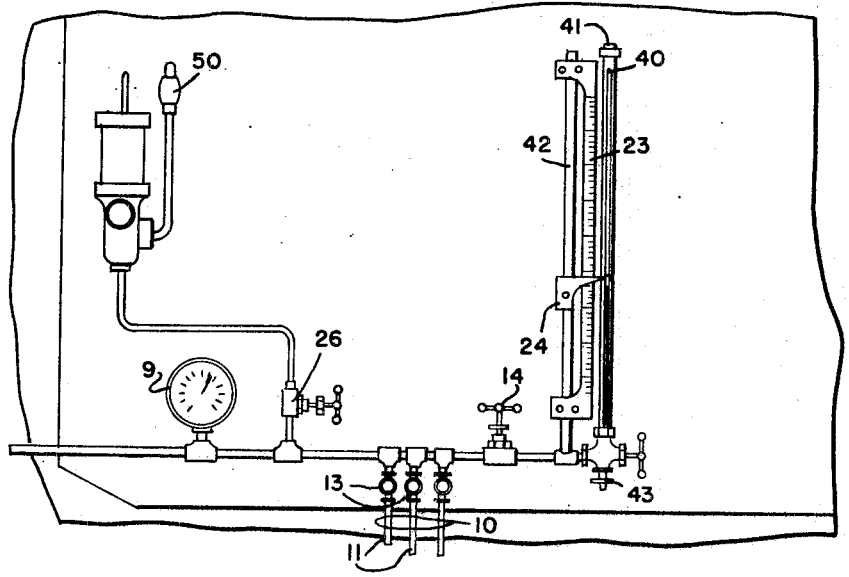
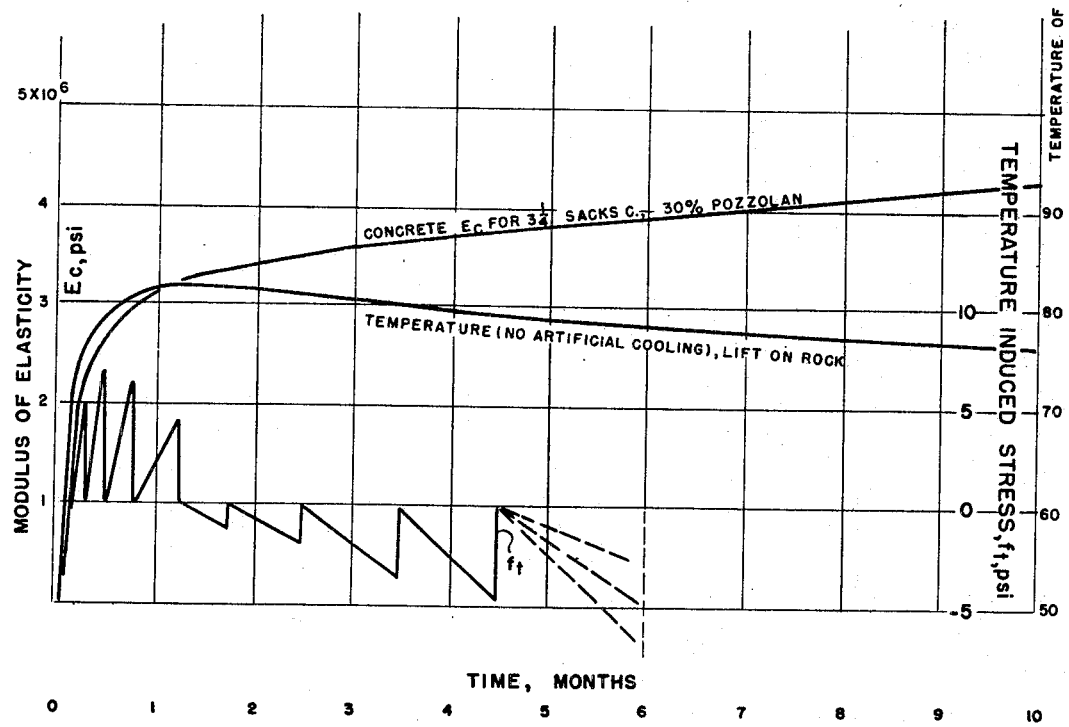
FIG. 6
INVENTOR.
ALEXANDER DODGE
BY
ATTORNEY

United States Patent Office 3,492,859
Patented Feb. 3, 1970

3,492,859
HYDRAULIC PRESSURE MEASURING SYSTEM
Alexander Dodge, 4218 NE. 37th Ave.,
Portland, Oreg. 97211
Filed Aug. 22, 1967, Ser. No. 662,550
Int. Cl. G01b 5/30
U.S. Cl. 73—88                                    7 Claims

ABSTRACT OF THE DISCLOSURE

This invention is a hydraulic device for the measurement of stresses in, or pressures on, a structure caused by external loads, temperature changes, shrinkage or autogenous growth due to changes in moisture content, chemical action or other causes. The device is essentially two plates separated by a chamber filled with a liquid. A pressure gage is connected to the liquid by a pipe. A compensating reservoir is utilized to vary the amount of fluid in the cell enabling the compressibility of the cell to be made to correspond to a surrounding medium. A standard liquid level indicator is connected to the system and is utilized to measure and correct for temperature induced stresses.

---

The invention described herein may be manufactured and used by or for the Government for governmental purposes without the payment to me of any royalty thereon.

BACKGROUND OF THE INVENTION

Prior art pressure measuring devices are essentially of three types, electrical, mechanical, and optical.

The electrical type of instruments fall into two groups: electrical transducers and dynamic transducers. Electrical transducers convert deformations in a structure into measurable electrical units. The data obtained in this manner is transformed by mathematic computations into strains and stresses. This type of electrical instrument is generally referred to as the "Carlson-type" instrument. The dynamic transducer type of device correlates deformations in a structure with deformations of a calibrated vibrating wire electronically by use of an oscilloscope. The data obtained corresponds to deformations from which strains and stresses are computed mathematically.

In mechanical devices, deformations in a structure are measured directly. Then the deformations are reduced to strains and stresses mathematically.

In optical devices, deformations are measured by reflection of light from a strained surface. The deformations are then reduced to stresses and strains mathematically.

Several problems exist with the prior art devices described above. For the most part these devices are precision instruments requiring exacting detail and close tolerances in fabrication. Because of the exacting detail and close tolerances required they are often severely affected by corrosion or slight liquid leaks in the system. This in turn often results in a short life expectancy for the device. Further, because of the exacting specifications of the devices they are often able to measure the desired stresses, strains or pressures only in a small area.

In an ideal circular measuring instrument it is desirable to create a very large diameter-thickness ratio. Most prior art devices have a low diameter-thickness ratio (usually not greater than 6), possibly because of the exact tolerances and precision required in their manufacture.

Most prior art devices cannot be made to correspond to compressibility to the material of the structure in which the stresses, strains or pressures to be measured are produced. As a result, the stresses, strains or pressures measured differ from those actually found in the structure for which measurement is desired. This factor further complicates the mathematics involved in computing the desired factors or requires extensive calibration or testing of the measuring devices.

In using many of the prior art devices it is often necessary that they be installed in specially prepared units or placed in a medium constructed of a somewhat different material from that in which the stresses are to be measured. This causes unknown alterations in stress patterns and results in deviations from measuring the true stress in the material.

SUMMARY OF THE INVENTION

This device works on the principle of incompressibility of liquids in hermetically sealed containers. The principal distinctions of the subject invention from the other types is that it is a hydraulic device that does not measure deformations in a structure and therefore does not require conversion of deformations into strain and stress by mathematical analyses.

It is therefore an object of this invention to provide a device which will directly indicate the stresses in or pressures on a structure.

It is a further object of this invention to provide a device which can measure pressures or stresses over either large or small areas.

Still a further object of this invention is to provide a device, the use of which does not alter the stress pattern in the structure.

Still a further object of this invention is to provide a device in which the diameter thickness ratio may be made very large.

Still a further object of this invention is to provide a simple device which can be used by an untrained person.

Still a further object is to provide a device which is relatively non-sensitive to deformations caused by temperature changes and which can be made to compensate for those stresses which do result from temperature change.

Still a further object is to provide a device which does not require excessive precision in fabrication or installation and which is relatively unaffected by corrosion or minute leaks of liquid from the system.

Still a further object is to provide a device with a long life expectancy.

Still a further object is to provide a cell which does not require installation in specially prepared units or placement in a medium different from that in which the pressure is to be measured.

Still a further object is to provide a device, the compressibility of which may be made to correspond to that of the material in which the stresses, strains or pressures to be measured are produced.

BRIEF DESCRIPTION OF THE DRAWINGS

FIG. 1 is a schematic view of the measuring cell in use;
FIG. 2 is a top view of the pressure measuring cell;
FIG. 3 is a sectional view of the pressure measuring cell taken along the line 3—3 of FIG. 2;
FIG. 4 is a view in elevation of the entire measuring system showing the compensating reservoir and liquid level indicator;
FIG. 5 is an alternative embodiment of the entire system; and
FIG. 6 is a graph showing the effect of time on the modules of elasticity and tempeartures of concrete.

DESCRIPTION OF THE PREFERRED EMBODIMENT

The preferred embodiment of the present invention has five main components, the pressure cell 1, pressure gage 9, compensating reservoir 10, liquid level gage 20, and a source of air pressure 30.

The pressure cell comprises two rigid plates 2, connected by a ring 3 to leave a small chamber 4 between the plates. There is an opening 5 at one end of the chamber which is filled by a plug 6. Opposite the opening 5, there is a second opening 7 to which a pipe line 8 is connected and hermetically sealed. The plates 2 may be of various dimensions and thicknesses, flat or curved for installation on curved surfaces and either welded, brazed, soldered, or otherwise joined around the edges to produce a hermetically sealed container or cell. In practice, the cell has been made of steel, but any rigid material such as plastic may be used. The ring 3 may be omitted if in joining the plates in another manner a space is formed between them.

The pipe line 8 leads to a pressure gage 9. Any commercially available pressure gage will serve to give the desired readings, however, it is preferable to use a gage which will measure and record and which has an adjustable pointer for repositioning or zeroing the pointer. A vernier adjustment can be made with the gage in operating position. Any Bourdon gage will suffice when measurement of only static pressure is required. When extremely rapid fluctuation in pressure or dynamic stresses are to be determined, (for example, water hammer pressures in conduits and power tunnels, seismic stresses, or pressures due to explosions), transducers such as vibrating wire transducers must be used. These instruments may be installed at any convenient location of the liquid system of the cell, preferably in a readily accessible place so that repair or replacement of the gage or transducer may be easily made.

The preferred embodiment for the compensating reservoir 10 is shown in FIG. 4. It comprises a set of pipes 11, hermetically sealed at one end 12 and in communication with the cell at the other. Each pipe 11 contains a measured quantity of liquid. Each pipe 11 is individually connected to the pipe line 8 through a valve 13. The operation of the compensating reservoir will be described below.

Valve 14 in the pipeline 8, separates the liquid level gage 20 from the remainder of the pressure measuring system.

A suitable liquid level gage 20 is installed on a vertical leg 21 of pipeline 8. In the preferred embodiment, the liquid level gage 20 has a visible glass section 22. This enables one to observe the level of liquid in the liquid level gage 20. The length of the visible glass 22 covers the maximum changes in the volume of the liquid in the system corresponding to prognosticated temperature variations in the structure. In a normal liquid level gage, the visible glass section is graduated in volumetric units. In the preferred embodiment, the volumetric graduations are converted to equivalent temperature variations in degrees and a scale 23 of temperature variations is placed adjacent to the visible glass 22 and secured to the vertical pipe 21. A pointer 24, slidably mounted on the vertical pipe 21, is provided for projecting the liquid level seen in the visible glass 22 to the temperature scale 23. A drain cock 27 is connected to the bottom of the liquid level indicator 20.

A valve 26 is provided on the vertical pipe 21, above the liquid level gage 20. This valve 26 is normally closed and is provided for protection of the pipe system from clogging with dust, dirt or water.

A suitable source of air pressure 30 such as a commercial cylinder of nitrogen or an air pump, is attached to the pipe above valve 26. The source of pressure may be portable.

Having described the preferred physical embodiment of this invention, the operation of the system will now be described.

To prepare the system for operation, the plug 6 is removed, the source of air pressure disconnected, all valves are open and the system is filled with hydraulic fluid through the pipeline. The liquid may be fed by gravity from a reservoir or forced in by a pump. While any hydraulic fluid may be used, glycerin has been used in practice.

The amount of fluid in the system is a measured quantity determined by the material of the structure in which the cell is to be placed, the expected temperature range within the structure and the type of fluid selected for use. This is more fully explained below.

When all air has been purged from the system through the opening 5, and the system is filled with fluid, the plug 6 is inserted. The pressure source 30 is connected and the system is presurized.

Valves 13, 14 and 26 are then closed. The gage 9 will now record the pressure within the cell. If an adjustable gage is used the pointer of the gage 9 may be set at zero after the system has been pressurized and before placing the cell in its desired location.

Once the system has been filled with fluid and initially pressurized, the pressure cell 1 may be installed in its desired location. The normal use of the cell would be to embed the cell in a structure at the point at which the pressures to be measured occurs, for example, in concrete. The valves, pressure gage and liquid level indicator would be placed in an accessible location and connected by the pipeline. (See FIG. 1.) Such installations may require pressurization of the system after partial or complete installation of its components.

When the cell has been embedded in a structure, the external pressure on the sides of the cell is transmitted from plate to plate directly through the liquid in the chamber. The magnitude of the external pressure is measured by the magnitude of the internal pressure in the chamber registered by the pressure gage. The pressure, indicated by the gage, comprises the applied pressure on the cell plus the internal pressure due to initial pressurization. To read the external pressure directly, a gage with an adjustable pointer should be used and zeroed before embedding the cell in a structure as described above. When the cell is installed in a rock or earth embankment, or incased in a concrete dam or other structure, the stresses or pressures in the surrounding material or structure are transmitted through the sealed liquid and registered by the gage.

The modulus of elasticity of concrete or soil is not constant, but varies a great deal with time, method of construction, and other factors, such as weather and artificial cooling. The stresses or pressures measured by the cell will differ from those actually present in the structure unless the compressibility of the cell can be made to coincide with that of the surrounding material.

The pressure cell of this invention is subjected to compressive loads only. For this reason it is possible to design the cell so that its compressibility is exactly the same as or can be constantly changed to match, varying compressibility of the original material, i.e., the compressibility of the material in which the cell is to be installed.

The design of a preferred embodiment will be described for a cell using steel plates and glycerin as the fluid. The same procedure can be used to design the cell using other material and fluids.

The design is done in the following manner.

In mechanics, the compressibility, (B), of a solid material stressed in one direction with a pressure of one pound per square inch (1 p.s.i.), is obtained from the relation: $B = t/E$, in which $(t)$ represents length or thickness in the direction of stress, and $(E)$ equals the modulus of elasticity of the material. Volumetric compressibility of a liquid, $b = V_2 - V_1/V_1$ $(P_2 - P_1)$, in which $(V_1)$ and $(V_2)$ are the original and compressed volumes. For design purposes, $(P_2 - P_1)$ is assumed to equal 1 p.s.i. In a cylinder with rigid side walls, volumetric change results in linear compressibility according to the formula, $b\ V_1/a = bt$, in which $(a)$ is the area and $(t)$ is the length of the cylinder. For glycerin, $b = 1.44\ (10^{-6})$. Applying these formulas to a cell made according to this invention which consists of two ½ inch thick steel plates, 30 inches inside diameter and a ⅛ inch space between the plates filled with 88 cubic inches of glycerin, the following results are obtained:

Compressibility of steel plates is $1/E = .000000033$ in.
Compressibility of glycerin is $.125b = .000000180$ in.
Compressibility of the cell (cylinder) $= .000000213$ in.

This is the "natural compressibility" of the cell. The "natural compressibility" is a new term which defines the novel idea in design. It means compressibility of a rigid composite body, or an entity like a hermetically sealed rigid cell of definite material and physical dimensions and filled with a liquid of certain characteristics. In order to install this cell in concrete, and have the compressibility of the cell and the concrete be the same, the modulus of elasticity of the concrete must be, $$E_c = 1.125/.000000213 = 5,280,000$$

p.s.i. If this were the case, the pressure gage will indicate the true stress in the concrete. If however, the modulus of elasticity of the concrete were 4,000,000 p.s.i., the compressibility of the cell would not be the same as the concrete and the gage will not read the true stresses or pressures in the concrete. To make the compressibility of the cell and the concrete coincide it would be necessary to change the characteristics of the cell. For example, when concrete has the modulus of elasticity of 4,000,000 p.s.i., the cell compressibility, (B), should be equal to $1.125/4,000,000 = .00000028$ inch. To satisfy this requirement, a cell with a total thickness of steel plates of .952 inch and the space for glycerin increased to .173 inch may be used. This would be:

Compressibility of steel plate $= .952/E_s = .000000032$ in.
Compressibility of glycerin $= .173b = .000000248$ in.
Compressibility (B) of the cell $= .00000028$ in.

This again is the "natural compressibility" but of a different cell. This solution is simple but impractical after the cell is embedded in the concrete. In a practical solution the cell dimensions can not be changed. It would be possible to vary the natural compressibility by using a fluid with a different compressibility, (b). This is also impractical when the cell is embedded in concrete. If only the volume of the fluid is changed, the compressibility of the cell and the concrete can be made to coincide. For example, if the required compressibility of the cell is .000000280 inch, and the compressibility of the steel plates is fixed at .000000033 inch, the required compressibility of the liquid is .000000247 inch. Using glycerin, the space between the plates should be increased to $.000000247/b$ or .172 inch, requiring a total volume of 121 cubic inches. But the volume of the chamber is fixed at 88 cubic inches, however, a supplementary rigid reservoir of 33 cubic inches capacity can be provided outside of and in direct communication with the chamber giving the same result as if the dimensions of the cell itself had been changed. The combined capacity of 121 cubic inches of glycerin increases the linear compressibility of the cell by a ratio of the total volume in the system, to the volume of glycerin in the cell.

Linear compressibility of the glycerin in the cell changes to $.125b(121/88)$ or .000000247 inch as needed to meet the requirement to produce a compressibility (B) of the cell of .00000028, that is, the same as the concrete. Similarly, for concrete of a modulus of elasticity of 3,000,000 p.s.i., compressibility (B) of the cell of $1.125/E_c = .000000375$ is obtained with a total volume of glycerin of 167 cubic inches in the system, or with an auxiliary reservoir of 79 cubic inches capacity. By adding an auxiliary reservoir of variable capacity, compressibility and modulus of elasticity of a cell may be readily changed to match that of a material having a varying modulus of elasticity. In this manner the gage pressures of the cell will always indicate the true stress in the structure.

The simplest design of an auxiliary reservoir is as shown in FIG. 4. It consists of a series of pipes 11, hermetically sealed at one end 12, and in communication with the cell at the other end. Each pipe 11 contains a measured volume of liquid and can individually communicate with the cell through valves 13. With all of the valves 13 open, there is a maximum quantity of fluid in the system to satisfy the minimum modulus of elasticity of the cell as required by design, predetermined by the nature of the structure in which the cell is to be installed. With all valves 13 closed, the fluid in the system is at a minimum to meet the maximum modulus of elasticity required by the design. By the selective operation of valves 13, intermediate valves of the modulus of elasticity of the cell may be obtained. In determining the modulus of elasticity of the cell, the volume of the liquid in the system includes all of the fluid in pipeline 8 extending from the cell 1 to valve 14 which is normally closed.

FIG. 6 shows a typical chart of changes in the modulus of elasticity and temperature of mass concrete in a dam on aging. By gradually reducing the liquid content of the chamber in direct communication with the cell to a predetermined volume, the cell compressibility and modulus of elasticity are adjusted to match gradually increasing modulus of elasticity of concrete, as shown by the curve.

As the temperature rises, expansion of the concrete and of the cell occurs. The coefficients of expansion of various materials are different, and that of a liquid may be many times greater than that of concrete and steel which are approximately equal. An unequal expansion, if not compensated in some manner, results in local temperature stresses.

For example, an increase in temperature of 30° F., 150 cubic inches of glycerin with a coefficient of expansion of .00034 per ° F., if not confined would expand 1.5 cubic inches, i.e. $(.00034)(150)(30)$. If the glycerin is confined in a completely filled rigid container, it is unable to expand in volume but stresses are produced in the container. It has been mathematically determined that for a pressure cell as described in this application, with 150 cubic inches of glycerin in the system, and the modulus of elasticity of the concrete of 4,000,000 p.s.i., a temperature increase of 30° F. results in stress of 150 p.s.i., approximately. This stress will be in the structure solely because of the presence of the pressure cell and will affect the indication of the true stresses or pressures in the structure. It is necessary to correct for these temperature induced stresses in order to determine the true stresses or pressures in the structure. Were the glycerin free to expand, the thermally induced stresses would not occur. It is necessary to keep the volume of the glycerin constant however, in order to avoid changing the compressibility of the cell. The volume of the fluid in the system can be kept constant and the temperature induced stresses eliminated if a quantity of fluid is removed from the system, corresponding to the volume by which the fluid would have expanded had the fluid not been confined.

For this purpose, the pipeline 8 is extended beyond the valve 14, and the liquid level gage is installed as described above. A small unmeasured volume of fluid, which does not participate in the function of the cell, is contained in the pipeline 8 beyond the valve 14, and in the liquid level indicator.

The liquid level indicator is used in the following manner. When the cell is installed, the liquid in the visible glass 22 and the temperature scale 23 at that time are marked with the pointer 24. After the heat of hydration raises the temperature of the concrete, and the cell above the temperature of placement of the concrete, the pointer 24 is reset to the present (higher) temperature. The liquid level seen in the visible glass 22, still corresponds to the original temperature. Valve 14 is opened and the liquid is gently bled from the cell until the liquid level in the visible glass 22 corresponds to the new position of the pointer. Then valve 14 is closed and the temperature induced stresses have been removed from the system. By repeating this procedure as the temperature increases, the true stress in the concrete can be determined until the highest temperature is reached. While concrete has been described in the example, it is obvious that the same apparatus and procedure could be used regardless of the material of the structure.

Where the structure is subjected to decreasing temperatures, the procedure is reversed. A decrease in temperature will cause a contraction of the fluid in the system greater than the contraction of the solid materials. It is therefore necessary to add fluid to the cell in order to maintain a constant volume of fluid in the cell. In this case the level of the fluid in the liquid level indicator is at the level of the original (higher) temperature. The pointer 24 is moved to the position of the present (lower) temperature on the scale 23. Valve 14 is opened and pressure source 30 is used to force liquid from the liquid level indicator to the cell until the level of liquid visible in the glass 22 falls to the level of the pointer at which time valve 14 is again closed.

In a new cycle of rising and falling temperature, the same procedures are repeated.

The liquid in the system between valves 14 and 26 remains at atmospheric pressure except during pumping operations.

In practicing the procedure set forth above, it is possible to measure the temperature induced stresses in the cell by recording the pressure indicated by the gage 9 before and after fluid is removed or injected into the cell. The difference between the two pressure readings is the measure of the pressure change due to the change in temperature.

The device used to compensate for the temperature induced stresses may vary greatly in detail from that shown, to accomplish the same results. A variation of the preferred embodiment is shown in FIG. 5 in which the liquid level gage is replaced by a commercial high-type shielded oil gage 40 with a vent hole in a cup nut 41 to allow free air communication with the atmosphere and minimize the possibility of dust, dirt, or water getting inside the oil gage 40. The vertical pipe 21 of the preferred embodiment is replaced by a vertical bar 42 attached to pipeline 8. A scale 23 and pointer 24 are attached to the bar 42. The scale 23 and pointer 24 are similar in design to those described in the preferred embodiment. The valve 26 is moved to a position ahead of valve 14. The oil gage 40 is never subjected to pressure and can be drained through a drain cock 43.

With this embodiment, in the event of rising temperatures, all operations are the same as described above for the preferred embodiment.

When there has been a decrease in temperature, the following procedure is followed. The pointer 24 is reset to the level of the present temperature, and the liquid is drained from the oil gage 40 to the same level. A suitable portable manually operated pump 50 for insertion of liquid into the system is attached to valve 26 and a volume of the liquid is injected into the system equal to the volume drained from the oil gage 40. For this purpose there may be used the Black Hawk Company, Interpack Model P-14, portable pump with .034 cubic inch displacement per stroke, or the Farval Corporation series DP-3A pump of .039 ounce per stroke. The Farval Corporation, Dualine valve, size DM-10 may also be used to control injections adjustable between the limits of .0094 maximum to .0012 minimum capacity ounce per stroke. Valve 26 is closed and the pump is disconnected. The gage pressure is read and recorded. The latter is the true stress in the structure. The difference between the latter and former readings represent relaxation of stress in the structure which has occurred because of unequal contraction between the cell and the structure.

The true stress in the structure may be determined in this manner until the lowest temperaure is reached. In a new cycle of rising or falling temperature the same procedure is repeated.

An alternative method for correcting for the difference in stress recorded by the gage and that actually in the stucture resulting from a decrease in temperature, using the alternative embodiment of the system shown in FIG. 5 is as follows.

When the temperature falls below the temperature previously indicated by the pointer 24 of the oil gage, the pointer 24 is reset to the level of the present temperature but a volume of the liquid is drained off equal to twice the volume between the former and the present temperature. The pressure gage 9 is read and the pressure recorded. A suitable portable manually operated pump 50 is attached to the valve 26 for injection of liquid into the system and the line from the pump 50 to the valve 26 is pressurized to the pressure indicated by the gage 9. Valve 26 is opened and by injection of liquid the pressure is increased by the amount of the temperature induced stress determined from the next preceding period for an equal drop in temperature. For example, the present reading is at the end of six months and the temperature is 78° F. The last preceding reading was taken at 4½ months and the temperature was 79°. At that time, it was determined that a one degree drop in temperature resulted in a 5 p.s.i. stress due to the difference in contraction between the cell and the structure. The present gage reading is 200 p.s.i. Inject fluid until the pressure gage reads 205 p.s.i. and close valve 26. Open valve 14 and raise the liquid level in the oil gage 40 to the level indicated by the pointer 24 (78°) and closed valve 14. Three possible situations may arise:

(1) If the correct volume of liquid were injected into the system, the gage pressure would return to 200 p.s.i.

(2) If the gage pressure is lower, (say 198 p.s.i.), not enough liquid was injected.

(3) If the gage pressure is higher, say 202 p.s.i., too much liquid was injected.

The unknown, but the exact volume of the injected liquid is determined by the corresponding correct thermal induced stress to be added to the present gage reading of 200 p.s.i. The thermal induced stress is determined for the three situations from simple solutions:

(1) $f_t = 205 - 200 = 5$ p.s.i.
(2) $f_t = 205 - 198 = 7$ p.s.i.
(3) $f_t = 205 - 202 = 3$ p.s.i.

The correct stresses in the structure for the above situations are 205, 207, and 203 p.s.i., respectively. Valve 26 is again opened and the correct pressure is induced into the system, which is the true stress in the structure. Valve 26, is closed, the pressure recorded and the pump is disconnected. The true stress in the structure may be determined in this manner until the lowest temperature is reached.

I claim:

1. A hermetically sealed, hydraulic pressure measuring system for measuring pressures in a material mass comprising:
(a) hydraulic sensing means imbedded in the material mass for detecting pressure;
(b) an external pressure gage connected through a fluid conduit to said hydraulic sensing means; and
(c) means cooperating with said hydraulic sensing means for continuously varying the compressibility of said hydraulic sensing means to correspond to the compressibility of the surrounding mass by varying the volume of fluid within said hydraulic sensing means while imbedded within said material means.

2. A hydraulic pressure measuring system as recited in claim 1 wherein said hydraulic sensing means comprises:
(a) a pair of rigid plates;
(b) means for connecting said plates to form a chamber between said plates, said chamber having an inlet port; and (c) means connected to said inlet port for injecting fluid into said chamber.

3. A pressure measuring system as recited in claim 2 wherein:

(a) said chamber has an outlet port; and (b) a plug is removably inserted in said outlet port to hermetically seal said chamber.

4. A pressure measuring system as recited in claim 2 wherein said means for varying the compressibility of said hydraulic sensing means comprises:

(a) a hermetically sealed reservoir of fluid connected to said chamber through said inlet port; and (b) valve means between said reservoir and said chamber for separating the fluid in said chamber from the fluid in said reservoir.

5. A pressure measuring system as recited in claim 4 wherein:

(a) said reservoir comprises a plurality of pipes of varying lengths, said pipes being hermetically sealed at one end and connected to said valve means at the other end, each of said pipes containing a measured quantity of fluid; and (b) said valve means comprises a plurality of valves corresponding to the number of said pipes.

6. A pressure measuring system as recited in claim 1 further comprising means cooperating with said pressure gage and said hydraulic pressure sensing means for measuring temperature induced stresses in said hydraulic sensing means.

7. A pressure measuring system as recited in claim 6 wherein said means for measuring temperature induced stresses comprises:

(a) a liquid level gage connected to said hydraulic pressure sensing means and said pressure gage by a fluid conduit; and (b) valve means in said conduit for separating said liquid level gage from said pressure gage and said hydraulic pressure sensing means.

References Cited

UNITED STATES PATENTS

| | | | |
|---|---|---|---|
| 3,427,876 | 2/1969 | Steele et al. | 73—141 |
| 2,704,202 | 3/1955 | Rhoades | 73—141 XR |
| 3,060,732 | 10/1962 | Corry | 73—141 |
| 3,286,514 | 11/1966 | Anderson | 73—88.5 |
| 3,355,936 | 12/1967 | Glotzl | 73—88.5 |

FOREIGN PATENTS

| | | |
|---|---|---|
| 857,222 | 12/1960 | Great Britain. |
| 268,577 | 9/1950 | Switzerland. |

CHARLES A. RUEHL, Primary Examiner

U.S. Cl. X.R.

73—84